US010313305B2

United States Patent
Claes et al.

(10) Patent No.: US 10,313,305 B2
(45) Date of Patent: Jun. 4, 2019

(54) METHOD OF UNBLOCKING EXTERNAL COMPUTER SYSTEMS IN A COMPUTER NETWORK INFRASTRUCTURE, DISTRIBUTED COMPUTER NETWORK HAVING SUCH A COMPUTER NETWORK INFRASTRUCTURE AS WELL AS COMPUTER PROGRAM PRODUCT

(71) Applicant: Fujitsu Technology Solutions Intellectual Property GmbH, München (DE)

(72) Inventors: Heinz-Josef Claes, Ronneburg (DE); Alexander Hosfeld, Verl (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 15/535,168

(22) PCT Filed: Jun. 27, 2016

(86) PCT No.: PCT/EP2016/064862
§ 371 (c)(1),
(2) Date: Jun. 12, 2017

(87) PCT Pub. No.: WO2017/001342
PCT Pub. Date: Jan. 5, 2017

(65) Prior Publication Data
US 2018/0109497 A1    Apr. 19, 2018

(30) Foreign Application Priority Data

Jun. 30, 2015 (DE) .................... 10 2015 110 501
Sep. 30, 2015 (DE) .................... 10 2015 115 601
Nov. 16, 2015 (DE) .................... 10 2015 119 779

(51) Int. Cl.
*H04L 29/06* (2006.01)
*H04L 12/46* (2006.01)

(52) U.S. Cl.
CPC ...... *H04L 63/0236* (2013.01); *H04L 12/4641* (2013.01); *H04L 63/08* (2013.01);
(Continued)

(58) Field of Classification Search
CPC . H04L 63/0236; H04L 12/4641; H04L 63/08; H04L 69/162; H04L 9/32
See application file for complete search history.

(56) References Cited

U.S. PATENT DOCUMENTS 8,976,798 B2 * 3/2015 Border ............... H04L 12/4641
370/401
2003/0056097 A1 3/2003 Araki et al.
(Continued)

FOREIGN PATENT DOCUMENTS

EP       1 265 406 A2   12/2002
JP       2003-91503      3/2003
(Continued)

OTHER PUBLICATIONS

Green, M. L. et al., "Grid-Enabled Virtual Organization Based Dynamic Firewall", *Proceedings of the Fifth IEEE/ACM International Workshop on Grid Computing*, Nov. 2004, Pittsburgh, USA, pp. 208-216.
(Continued)

Primary Examiner — Jason K Gee
Assistant Examiner — Ka Shan Choy
(74) Attorney, Agent, or Firm — DLA Piper LLP (US)

(57) ABSTRACT

A method unblocks external computer systems for communication with secured processing computer systems in a computer network infrastructure. An instruction packet is transmitted from an external computer system to a broker
(Continued)

computer system within the computer network infrastructure. A random port number of a network port is then generated by the broker computer system, and the random port number is transmitted to a processing computer system. The processing computer system at least temporarily keeps predetermined network ports closed so that access by the external computer system via network by the network ports is prevented, wherein the random port number and/or other information can be interchanged between the processing computer system and the broker computer system, however. Subsequently, the network port corresponding to the random port number is unblocked by the processing computer system, and a connection to the unblocked network port of the processing computer system is established by the external computer system.

10 Claims, 2 Drawing Sheets

(52) U.S. Cl.
CPC ............ H04L 63/10 (2013.01); H04L 63/166 (2013.01); H04L 69/162 (2013.01); G06F 2221/2101 (2013.01); H04L 63/102 (2013.01); H04L 63/145 (2013.01)

(56) References Cited

U.S. PATENT DOCUMENTS

| | | |
|---|---|---|
| 2005/0265351 A1 | 12/2005 | Smith et al. |
| 2006/0168136 A1 | 7/2006 | Bethlehem et al. |
| 2007/0067625 A1* | 3/2007 | Jiang ...................... H04L 63/10 713/168 |
| 2007/0180126 A1 | 8/2007 | Merkh et al. |
| 2009/0106834 A1* | 4/2009 | Borzycki .............. H04L 63/166 726/21 |
| 2011/0185039 A1 | 7/2011 | Ueno et al. |
| 2013/0262858 A1* | 10/2013 | Neuman ................ H04L 63/08 713/155 |
| 2014/0222955 A1* | 8/2014 | Islam .................. H04L 63/0876 709/217 |
| 2014/0331297 A1* | 11/2014 | Innes ...................... H04L 63/08 726/7 |
| 2016/0189147 A1* | 6/2016 | Vanczak ................ G06Q 20/32 705/71 |

FOREIGN PATENT DOCUMENTS

| | | |
|---|---|---|
| JP | 2006-005947 | 1/2006 |
| JP | 2007-200209 | 8/2007 |
| JP | 2007-259384 | 10/2007 |
| JP | 2011-155545 | 8/2011 |
| JP | 2013-201621 A | 10/2013 |
| WO | 2015/080731 A1 | 6/2015 |

OTHER PUBLICATIONS

"Konfiguration von VPN-Servern und Firewalls", https://msdn.microsoft.com/dede/library/cc737500(v=ws.10).aspx, Jan. 2005, along with an English translation.

Japanese Office Action dated May 29, 2018, of corresponding Japanese Application No. 2017-526518, along with an English translation.

* cited by examiner

METHOD OF UNBLOCKING EXTERNAL COMPUTER SYSTEMS IN A COMPUTER NETWORK INFRASTRUCTURE, DISTRIBUTED COMPUTER NETWORK HAVING SUCH A COMPUTER NETWORK INFRASTRUCTURE AS WELL AS COMPUTER PROGRAM PRODUCT

TECHNICAL FIELD

This disclosure relates to a method of unblocking external computer systems for communication with secured processing computer systems in a computer network infrastructure, a distributed computer network with a computer network infrastructure and at least one external computer system, as well as a computer program product that performs a corresponding method.

BACKGROUND

Distributed computer systems describe a plurality of computer systems that can communicate with one another via data connections in computer network infrastructures in an organized manner. For example, distributed computer networks are applied in computer network infrastructures that include server client topologies, wherein to some extent confidential data, e.g. customer data or user data, is exchanged between a client and a server and wherein access of third parties to this data must be prevented.

In secured computer network infrastructures, processing computer systems, on which (confidential) data is processed, are secured in a special way. For example, predetermined network ports of the processing computer system can be initially closed so that access or connection establishment to a corresponding processing computer system via network is not possible.

Conventional solutions send predetermined knock signals via network to a processing computer system with network ports closed in the way mentioned above (so-called port-knocking), wherein a predetermined data sequence addresses predetermined network ports of the processing computer system. That data sequence is compared to a predetermined sequence in the processing computer system, with the processing computer system opening one or multiple network ports in the case of success, to permit a connection to be established externally via network.

One risk of those measures is that a processing computer system is thus opened for hackers or non-authorized computer systems manipulating a corresponding port-knocking process. In this way, (manipulative) access to possibly confidential data in the processing computer system by the opened network ports is possible for third parties. Furthermore, a running program is required on one or multiple network ports of the processing computer system for an addressability of services in the opened processing computer system. This running program poses a potential security gap for external attacks via network (e.g. via buffer overflows or so-called denial-of-service attacks).

An explicit authentication of an external computer system directly at a processing computer system within the computer network infrastructure for access can be discarded in conventional solutions since a processing computer system—as described above—will initially not permit any external connection establishment via closed network ports.

On the other hand, addressing of an external computer system, which requires access to a processing computer system, from the processing computer system is often very complicated or even impossible, because the external computer system may be secured per se and is possibly not addressable for connection establishment.

Moreover, most of the time, access to processing computer systems within a computer network infrastructure is effected via the internet or a separate intranet (e.g. for unblocking applications), wherein such accesses are often characterized in that the external computer system accessing the computer network infrastructure (e.g. a computing center) comes from a private access, which does not use a (unambiguous) public IP address. Examples include cascaded connections via a proxy or by so-called NAT/PAT mask methods (NAT=network address translation, PAT=port address translation).

This results in a situation where basically no connection can be initiated from a processing computer system within the computer network infrastructure to the corresponding external computer system because the processing computer system neither knows the exact IP address nor the port of the external computer system due to the masking thereof. Furthermore, the IP address is usually private and cannot directly be used in a routing process. In addition, in communication, it is usually secured behind a firewall.

It could therefore be helpful to enable secured unblocking of external computer systems for communication with secured processing computer systems within a computer network infrastructure by technical measures and nevertheless improve protection from attacks to corresponding computer systems in the computer network infrastructure.

SUMMARY

We provide a method of unblocking external computer systems for communication with a secured processing computer system in a computer network infrastructure, including transmitting an instruction packet from an external computer system, which is configured outside the computer network infrastructure, to a broker computer system within the computer network infrastructure, generating a random port number of a network port by the broker computer system, transmitting the random port number from the broker computer system to the external computer system and at least one processing computer system within the computer network infrastructure in an automated manner, wherein the processing computer system at least temporarily keeps predetermined network ports closed toward the external computer system so that access to the processing computer system by the external computer system via network by the network ports is prevented, unblocking the network port corresponding to the random port number by the processing computer system for communication with the external computer system, establishing a connection to the unblocked network port of the processing computer system by the external computer system, and after establishing the connection to the selectively unblocked network port of the processing computer system, communication is restricted between the processing computer system and the external computer system to the unblocked network port of the processing computer system and a network port of the external computer system known to the processing computer system by the established connection.

We also provide a distributed computer network including a computer network infrastructure including at least a broker computer system and a processing computer system, and at least an external computer system located outside the computer network infrastructure, wherein the external computer system is configured to transmit an instruction packet to the broker computer system for instructing communication with the processing computer system, the broker computer system is configured to generate a random port number of a network port in an automated manner and transmit the random port number both to the processing computer system and to the external computer system, the processing computer system includes an access control unit configured to keep predetermined network ports at least temporarily closed such that access to the processing computer system by the external computer system via a network by the network ports is prevented, but connection establishment between the processing computer system and the broker computer system is permitted to exchange the random port number or other information, the access control unit is further configured to unblock a network port corresponding to the random port number for communication with the external computer system and, after establishment of a connection to the selectively unblocked network port of the processing computer system, to restrict communication between the processing computer system and the external computer system to the unblocked network port of the processing computer system and a network port of the external computer system, known to the processing computer system by the established connection.

We further provide a computer program product configured to be executed on one or multiple computer systems and which, when executed, performs a method including transmitting an instruction packet from an external computer system, which is configured outside the computer network infrastructure, to a broker computer system within the computer network infrastructure, generating a random port number of a network port by the broker computer system, transmitting the random port number from the broker computer system to the external computer system and at least one processing computer system within the computer network infrastructure in an automated manner, wherein the processing computer system at least temporarily keeps predetermined network ports closed toward the external computer system so that access to the processing computer system by the external computer system via network by the network ports is prevented, unblocking the network port corresponding to the random port number by the processing computer system for communication with the external computer system, establishing a connection to the unblocked network port of the processing computer system by the external computer system, and after establishing the connection to the selectively unblocked network port of the processing computer system, communication is restricted between the processing computer system and the external computer system to the unblocked network port of the processing computer system and a network port of the external computer system known to the processing computer system by the established connection.

| List of reference numerals | |
|---|---|
| Task server | broker computer system |
| Task server 1 | broker computer system |
| Task server 2 | broker computer system |
| Target server | processing computer system |
| Target server 1 | processing computer system |
| Target server 2 | processing computer system |
| N, N1, N2, N3 | Network |
| FW | packet filter, firewall |
| 1 to 3 | method steps |
| 1' to 3' | method steps |

DETAILED DESCRIPTION

We provide the following steps in the method of unblocking external computer systems for communication with secured processing computer systems in a computer network infrastructure.

First, an instruction packet is transmitted from an external computer system configured outside the computer network infrastructure to a broker computer system within the computer network infrastructure. The instruction packet indicates to the broker computer system an instruction of the external computer system for desired communication with a processing computer system within the computer network infrastructure. For example, the instruction packet can be configured as a so-called token, which is handed over to the broker computer system by the external computer system in accordance with a certain transmission protocol. The instruction packet may also contain (possibly signed) information for authentication of the external computer system.

Triggered by the transmission of the instruction packet, a random port number of a network port is generated by the broker computer system. Thus, the random port number provides a randomly selected network port for a further unblocking of a processing computer system according to the method. Determination of the random port number can be effected by aleatoric known methods.

The random port number is transmitted from the broker computer system to the external computer system as well as to at least one processing computer system within the computer network infrastructure in an automated manner. The processing computer system at least temporarily keeps predetermined network ports closed toward the external computer system so that access to the processing computer system by the external computer system via network by these network ports is prevented. However, the random port number or other information can be exchanged between the processing computer system and the broker computer system. This process can be effected via a common access network between the broker computer system and the processing computer system, or via a special connection network provided to that end between the broker computer system and the processing computer system.

Furthermore, according to the method, the network port corresponding to the random port number is unblocked for communication with the external computer system by the processing computer system and subsequently a connection to the unblocked network port of the processing computer system is established by the external computer system.

Initially, in the described method, all predetermined network ports of the processing computer system are closed toward the external computer system for access by the external computer system. The processing computer system thus behaves like an encapsulated (specifically secured) system toward the external computer system. Access of the external computer system via network to the processing computer system is not possible or considerably more difficult at least under certain operating conditions (advantageously permanently while performing the method described herein without targeted unblocking). Attempts to establish a connection to the processing computer system by the external computer system will be ignored or discarded by the processing computer system in this case. This can be achieved by specific port filters, port blocks and/or firewall rules.

Advantageously, the processing computer system at least temporarily also keeps predetermined network ports closed toward the broker computer system such that access to the processing computer system by the broker computer system via network is prevented by the network ports. In this case, attempts to establish a connection to the processing computer system by the broker computer system will be ignored or discarded by the processing computer system. This can be achieved by specific port filters, port blocks and/or firewall rules, e.g. specifically for the IP address of the broker computer system. However, the processing computer system can access the broker computer system to fetch the random port number or other information from the broker computer system.

The term "predetermined network ports" means that all or only selected security-relevant network ports in the processing computer system, e.g. the network ports used for this method, are permanently (these ports are not considered when generating the random port number and thus never unblocked according to the described method) or temporarily (these ports are considered when generating the random port number and can be selectively unblocked according to the described method) closed.

This provides the advantage that initially no programs or services are configured or available on the processing computer system to unblock communication with an external computer system, that would listen externally to the corresponding network ports for the purpose of addressability or connection establishment and thereby present a potential security gap (e.g. for buffer overflows or Denial-of-Service attacks and so-called distributed DoS attacks, respectively). Thus, the term "closed network ports" in this context means that these ports are not "listening ports", i.e. external connection establishment is not permitted (without authorized unblocking according to the method). In this case, third parties (hackers) won't be able to authenticate or log on to the processing computer system externally via network, e.g. in UNIX-based systems via a secure-Shell-Daemon (SSH), a http-service or other services/applications or the like, or to perform specific actions on the processing computer system.

Nevertheless, local access to the processing computer system may be configured for a predetermined user group (e.g. security personnel). However, other third parties are prevented from having local access to the processing computer system.

Thus, due to the general encapsulation of the processing computer system according to the described type, attacks via network are made more complicated because a decisive attacking option, namely running services or programs on opened ("listening") network ports of the respective systems is suppressed. Thus, in the explained method, in particular security relevant data, which is processed locally on the processing computer system, is protected from attacks.

To unblock communication between the external computer system outside the computer network infrastructure and the processing computer system within the computer network infrastructure, the method permits, in contrast to the processing computer system, access from outside the computer network infrastructure to the at least one broker computer system within the computer network infrastructure. The broker computer system is accessible via network as an "open" system having at least one addressable open ("listening") network port. For example, this means that programs run and/or applications (services) are prepared on the broker computer system so that each of the processing computer system within the computer network infrastructure and the external computer system outside the computer network infrastructure can access the broker computer system and establish a connection to the broker computer system to store data packets or other information (via a then "established" connection) in the broker computer system or fetch it from there. In terms of security, such an "open" broker computer system is to be evaluated like a traditional, specifically secured computer system.

Thus, the broker computer system serves as a (secured, but listening) broker for communication between the processing computer system and the external computer system.

Advantageously, connection establishment between the processing computer system and the broker computer system within the computer network infrastructure is effected via an internal network, which may be secured as a "Virtual Private Network" (VPN) or Secure-Shell-Network (SSH) or as a combination thereof, for example.

A connection establishment from the external computer system outside the computer network infrastructure to the broker computer system within the computer network infrastructure is effected via internet or routing from a separate intranet (e.g. a client intranet), for example. For example, the external computer system can be a client located behind a NAT- and/or PAT router. Here, connection establishment to the broker computer system is effected from a local client intranet via a private source IP address of the client, which is masked in the router with a public IP address of the router.

A random port number of a network port is generated by the broker computer system to unblock the external computer system for communication with the initially secured processing computer system within the computer network infrastructure. This generation is initiated by transmission of the instruction packet from the external computer system to the broker computer system.

Advantageously, the instruction packet contains an instruction or a command to unblock and establish a communication connection between the external computer system and a dedicated processing computer system, e.g. to access a service or an application in this processing computer system. The instruction packet may also contain signed information about the external computer system. This information may include information about a service or generally a process to be addressed on the processing computer system, which is to be addressed by the external computer system. It is also possible to provide information for authentication of the external computer system in the instruction packet. Signing corresponding information in the instruction packet provides the advantage that a manipulation of the instruction packet is made complicated. Advantageously, the instruction packet is encrypted in the external computer system before being transmitted to the broker computer system.

Generation of the random port number can be automatically effected as early as during a connection establishment to transmit the instruction packet from the external computer system to the broker computer system. Alternatively, it is possible to perform generation of the random port number only after a connection establishment, i.e. after successfully establishing a connection between the external computer system and the broker computer system.

The generated random port number provides a specific network port in the processing computer system, which is to be unblocked as a destination port for a connection establishment from the external computer system to the processing computer system. The random port number is optionally encrypted after being generated in the broker computer system. The encryption is advantageously effected such that the value can (exclusively) be decrypted by the external computer system and by the processing computer system for the further processing of the random port number according to the method.

Advantageously, the generated random port number is supplemented by the IP address visible to the broker computer system (and thus also to the processing computer system) and that can be assigned to the external computer system. This IP address may be the address of an NAT router from which the broker computer system directly received the instruction packet. The random port number can be packed together with the IP address, which can be assigned to the external computer system, in a data packet, that is subsequently transmitted from the broker computer system to the processing computer system. The data packet may optionally also contain information from the instruction packet and thus coincide with the instruction packet. Advantageously, this data packet is encrypted as well.

For transmission of the random port number and, possibly, the IP address, which is assignable to the external computer system, to the processing computer system, a process is triggered, wherein a connection via network is established between the processing computer system and the broker computer system.

When the processing computer system also keeps the relevant network ports closed toward the broker computer system and does not permit connection establishment from the broker computer system, a process is initiated for the transmission of the random port number and, possibly, the IP address, which is assignable to the external computer system, to the processing computer system, wherein the processing computer system per se addresses the broker computer system via network and establishes a connection to the broker computer system.

The above described information (random port number and possibly IP address) can be called up in the broker computer system and automatically be transmitted from the broker computer system to the processing computer system via an "established" connection in an automated manner. Advantageously, the "automated" transmission is designed such that a third party does not have any influencing options on it or influencing options are very complicated, which is why a risk of manipulation of the exchanged data or of one of the involved computer systems is excluded or significantly reduced.

After successful transmission of the random port number, the network port corresponding to the random port number in the processing computer system is unblocked. In a transmission of the IP address assigned to the external computer system as a source IP address, the term "unblocking" in this context means that this source IP address is selectively unblocked at the destination network port of the processing computer system corresponding to the random port number, for communication to and with the processing computer system (via one of a plurality of source network ports combined with the source IP address).

Advantageously, the unblocked network port determined by the random port number is re-routed in the processing computer system to a port by default assigned to a certain service or daemon. In this way, the corresponding service is addressable via the unblocked network port without reconfiguring the service for a random network port for every unblocking procedure. This assignment can be effected dynamically or be determined statically in advance.

After unblocking the network port determined by the random port number by the processing computer system, finally, a connection (new session) to this selectively unblocked network port is established by the external computer system (via the unblocked IP address and a specific source network port). This new established connection may be an SSH connection, a VPN connection or a combination thereof. For example, it is possible to establish an SSH connection, in which a VPN connection is established then.

It is advantageous to permit a corresponding connection establishment only in a predetermined time frame, which may be short depending on the application (i.e. in each case depending on the network speed several milliseconds or several seconds, e.g. up to 20 seconds, or even up to several minutes). If a connection is not established by the external computer system within the predetermined time frame, the selectively unblocked network port of the processing computer system is closed for security reasons to reduce the risk of an abusive connection establishment or misuse of the opened network port (e.g. by port scanning) by computer systems having the (by chance) same IP address, which are located behind the same NAT router, for example.

One use of our method lies with unblocking an application on a processing computer system for an external client, for example, which requests a targeted (and nevertheless restricted and to some extent secured) unblocking of the processing computer system within the computer network infrastructure. For example, the computer network infrastructure can be a VPN server, to which a VPN connection can be established after the unblocking. Access to certain services, e.g. another server, of the computer network infrastructure is possible via this VPN connection.

The general advantage of the method described herein is that an insecure and attackable opening of network ports at the processing computer system following a manipulative request of an external computer system (e.g. via port knocking) is prevented. Moreover, the processing computer system does not have to or cannot establish a connection to outside the computer network infrastructure to authenticate an (initially) unknown source. Furthermore, it is prevented that the processing computer system permits an external connection without knowing whether the counterpart is trustworthy or not.

Before unblocking communication with an external computer system, merely a secured communication with the internal broker computer system within the computer network infrastructure is effected on the side of the processing computer system to fetch information about a generated random port number and possibly a source IP address of the external computer system to unblock a corresponding network port, as described above. Not before that, the corresponding network port and possibly the source IP address is unblocked for communication with the external computer system in a targeted manner.

An attacker, who (by chance) uses the same IP address as the external computer system, e.g. because the attacker is located behind the same NAT router, has the option of carrying out manipulations to the processing computer system within the limited time of unblocking the network port in the processing computer system for the external computer system, e.g. in the initialization phase of a connection establishment. For example, an attacker could use a so-called "Zero-Day-Exploit" to start an attack to the process computer system. The probability and option for such an attack is to be evaluated as being very low because of the circumstances to be assumed for that (same IP address visible to the processing computer system, suitable time slot, as well as presence and access to manipulation options such as a Zero-Day-Exploit).

By the use of a network port randomly unblocked for each external connection (due to a random port number respectively generated in the broker computer system), the probability of an attack at a suitable point of time and at a suitable network port is significantly reduced compared to conventional variants. Even the port scans required for an attack become significantly more elaborate. Thus, the probability of an attack on the processing computer system is extremely reduced by the measures according to the method of the above described type, in particular by generation of a random port number to unblock a corresponding network port.

Advantageously, after establishing a connection to the selectively unblocked network port of the processing computer system, via which the subsequent communication with the external computer system is effected, the following additional step is carried out:

restricting communication between the processing computer system and the external computer system to the unblocked network port of the processing computer system and a network port of the external computer system known to the processing computer system (as a source network port) through the established connection. In this measure, it is to be taken into account that possibly parallel connection establishments of multiple computer systems do not interfere with one another.

A restriction to the selective source network port of the external computer system provides the advantage that other communication is suppressed. Thus, the external computer system can communicate with the processing computer system only in a manner restricted to individual network ports (on both sides), i.e. source network port of the external computer system and unblocked destination network port of the processing computer system. The selective network port of the external computer system can be the source network port of the last transmission by the established connection, for example. If, for example, the external computer system is located behind an NAT router, non-authorized systems or attackers, also located behind the NAT router, are prevented from being able to establish a connection to the processing computer system in addition to the already established connection between the external computer system and the processing computer system (via the same source IP address and a different source network port of the NAT router), thereby preventing them from getting non-authorized access to the processing computer system. Thus, the above measures allow a targeted restriction of access to the processing computer system via an authorized (individual) network connection. Other non-authorized connections or their attempts to establish a connection are discarded or not considered in the processing computer system.

Advantageously, in the method of the described type, the following further measures are performed:

restricting connection to the selectively unblocked network port of the processing computer system established by the external computer system to an exchange of authentication information between the external computer system and the processing computer system, verifying the authentication information transmitted by the external computer system, unblocking the connection to the selectively unblocked network port of the processing computer system established by the external computer system for further access to the processing computer system or to further processing computer systems within the computer network infrastructure, if the verification of the authentication information was successful.

By these measures, connection to the selectively unblocked network port of the processing computer system established by the external computer system is restricted initially to the exchange of authentication information. In this state, access of the external computer system to the processing computer system within the computer network infrastructure, in particular access to certain desired services within the computer network infrastructure, is blocked or significantly restricted. Thus, connection between the external computer system and the processing computer system is actually established, but can not yet be used by the external computer system except for the exchange of authentication information.

Rather, transmission of the authentication information by the external computer system is required first. This transmitted authentication information is verified within the computer network infrastructure, e.g. by the processing computer system, further processing computer systems and/or another authentication entity checking the connection (e.g. a firewall). The connection between the external computer system and the processing computer system for a further data exchange is unblocked only upon positive verification of the authentication information.

The connection between the external computer system and the processing computer system can be restricted or blocked by predetermined firewall rules, for example (except for an exchange of authentication information). Thus, by the firewall rules, only a defined data exchange of authentication information is permitted. Furthermore, connection of the external computer system to further processing computer systems within the computer network infrastructure can be restricted or blocked by the firewall rules (except from a potential exchange of required authentication information with these systems). For example, merely restricted connection establishments to further processing computer systems within the computer network infrastructure may be permitted for an exchange of authentication information via ports on these systems specifically unblocked to that end (e.g. port 22 for an SSH connection).

After a positive verification of the transmitted authentication information, the firewall rules can be partially or completely be overturned so that the external computer system finally gets access to services of the processing computer system or further systems within the computer network infrastructure via the established connection. For example, this can be effected by unblocking desired IP addresses or network ports of the system connected to the processing computer system within the computer network infrastructure.

One advantage of the measures mentioned at this point lies with the fact that after an establishment of a connection from the external computer system to the processing computer system, the connection is initially restricted such that attacking options originating from the direction of the external computer system are not possible or significantly complicated during verification of an authentication of the external computer system. This is particularly useful if parts of the infrastructure are under the thumb of an attacker (e.g.

a router on the connection path between the external computer system and the processing computer system).

Alternatively, nested connections between the external computer system and the processing computer system may as well be provided. For example, first a SSH connection could be carried out for the establishment of the connection from the external computer system to the processing computer system. A VPN connection can be generated, i.e. established, in the SSH tunnel established then. In this VPN connection in turn, authentication by another authentication process could be performed (e.g. "https"). It is also possible to have multiple VPN connections nested with one another. In this case, advantageously different algorithms would have to be used.

For example, the authentication information can be transmitted in a so-called verification packet from the external computer system to the processing computer system. Sending the verification packet ensures that the connection had been established from the correct authorized entity (and not by non-authorized third parties, e.g. having the same IP address located behind an NAT router or having a manipulated IP address). Thus, the above described measures ensure that after unblocking the selective destination network port of the processing computer system, the entity that had previously requested a corresponding connection via the instruction packet is actually the external entity that establishes the connection to the processing computer system.

The authentication information may include certain authorization and identity properties of the external computer system, which are verified and confirmed by stored comparison information in the processing computer system or other authentication entities. Such authorization or identity properties may include, e.g. features of the hardware of the external computer system, biometric features of certain users of the external computer system as well as passwords (pass phrases or credentials, keys and the like).

Preferably, the following additional steps are performed in the method:

transmitting a first random number from the external computer system to the broker computer system, generating a second random number by the broker computer system, transmitting the second random number from the broker computer system to the external computer system, as well as transmitting the first and second random numbers from the broker computer system to the processing computer system.

When the processing computer system also keeps the relevant network ports closed toward the broker computer system and does not permit connection establishment from the broker computer system, a process is initiated for transmission of the first and second random numbers to the processing computer system, wherein the processing computer system accesses the broker computer system to fetch the first and second random number of the broker computer system.

Generation and transmission of random numbers between the involved computer systems (external computer system, broker computer system as well as processing computer system) can be effected along with the exchange of authentication information of the above described type, or respectively form a special kind of authentication information, and advantageously serves both for the validation of the external computer system toward the computer network infrastructure and the verification of the manipulative attempts or faking of the described processes in the broker computer system. Since the random numbers are randomly generated to individually unblock an external computer system, they are valid only for this unblocking. As a result, a reproduced fake of random numbers for manipulation of future unblocking processes is made extremely complicated or hardly possible. Due to the generation of a respective random number both in the external computer system and in the broker computer system, a validation of the involved computer systems or a verification of individual process steps is possible by the processing computer system. Generation of random numbers can be effected by aleatoric known measures.

Advantageously, the random numbers are encrypted by the involved computer systems in which they are generated such that only the processing computer system can decrypt them. Encryption can be effected by an asymmetric encryption method, for example (e.g. methods including a public and a private key). This makes it difficult for a computer system other than the processing computer system to read or even manipulate the respective random number. To that end, an encryption would have to be surpassed first.

Hereinafter, functionality of the random numbers will be explained in more detail with reference to an example. A first random number Z1 is generated by the external computer system and transmitted to the broker computer system. The random number Z1 can be included in the instruction packet, for example. Here, Z1 is encrypted such that the content can only be read by the processing computer system. During or after transmission of the instruction packet from the external computer system to the broker computer system, a second random number Z2 is generated by the broker computer system. Just as well, Z2 is encrypted such that only the processing computer system can decrypt it. Z2 is transmitted from the broker computer system to the external computer system during or after transmission of the instruction packet. Thus, after the exchange of Z1 and Z2 between the external computer system and the broker computer system, the two random numbers Z1 and Z2 exist in both computer systems, one of which was generated on the computer system per se and the other one was generated on the other computer system. Here, Z1 cannot be read by the broker computer system and Z2 cannot be read by the external computer system since they are encrypted. Z1 and Z2 are transmitted in a further step from the broker computer system to the processing computer system (together with other information). In the processing computer system, the random numbers Z1 and Z2 can subsequently be verified, as described below.

Advantageously, the first random number Z1 is signed with a signature of the external computer system. Furthermore, the second random number Z2 generated in the broker computer system is signed with a signature of the broker computer system prior to the transmission. A respective signature of the random numbers in the generating computer system has the advantage that the random numbers can be verified in terms of the generating computer system. As a result, a certain degree of security against faking of the random numbers by other, possibly not trustworthy, computer systems is provided. For example, a signature can be effected by a private key of the corresponding computer system.

Preferably, the signatures of the random numbers are expanded in that after the transmission of the signed first random number Z1 from the external computer system to the broker computer system, the signature of the first random number Z1 is signed with another signature of the broker computer system and in that after the transmission of the signed second random number Z2 from the broker computer system to the external computer system, the signature of the second random number Z2 is signed with another signature of the external computer system. In this way, the signed random numbers Z1 and Z2 are signed by the respective other computer system once again. Thus, the order of the transfer of the random numbers Z1 and Z2 between the external computer system and the broker computer system can be considered for further verification, e.g. in the processing computer system.

Advantageously, after establishing a connection to the selectively unblocked network port of the processing computer system by the external computer system, the following steps are performed:

transmitting the first and second random number from the external computer system directly to the processing computer system by the established connection, as well as verifying a respective match between the first and second random numbers transmitted to the processing computer system by the broker computer system, and the first and second random numbers directly transmitted to the processing computer system by the external computer system, in the processing computer system.

Thus, due to the described measures, finally there are two pairs of random numbers (Z1 and Z2) in the processing computer system. One pair was transmitted to the processing computer system from the broker computer system, and the other pair was transmitted to the processing computer system from the external computer system. A match between the two pairs of random numbers, specifically a match between the two first random numbers (Z1) and a match between the two second random numbers (Z2) can be verified in the processing computer system. In particular, the random numbers are decrypted in the processing computer system and the exchange of the random numbers between the external computer system and the broker computer system is understood by the processing computer system by the multiple signatures of the random numbers (as described above). Furthermore, the values of the respective random numbers are compared to one another.

Advantageously, a connection between the external computer system and the processing computer system established after unblocking the corresponding network port is disestablished by the processing computer system, when the above described verification of the respective match of the first and second random numbers (Z1 and Z2) by the processing computer system is negative. In this case, the processing computer system acts upon the assumption that this is a manipulation attempt and aborts the connection to the external computer system for safety reasons.

Manipulation of unblocking the external computer system is made extremely complex by the described measures of generating, exchanging and verifying multiple random numbers between the involved computer systems. Here, both a manipulation attempt by the external computer system and a manipulation attempt by the broker computer system is detected by the processing computer system by a verification of the random numbers, and corresponding measures are taken (abortion of the external connection).

When the processing computer system keeps the relevant network ports also closed toward the broker computer system and does not permit a connection establishment from the broker computer system, as described above, the transmission of the random port number or other information from the broker computer system to the processing computer system advantageously comprises the following steps:

sending a predetermined data sequence from the broker computer system or from the external computer system to the processing computer system, wherein the predetermined network ports of the processing computer system are closed and wherein the sequence addresses one or multiple network ports of the processing computer system in a predetermined order, verifying whether the sent data sequence matches a predefined sequence in the processing computer system, as well as causing transmission of the random port number or other information by the processing computer system, if verification of the sent sequence is positive, wherein the processing computer system per se establishes a connection to the broker computer system and fetches the random port number or other information from the broker computer system.

The measures have the advantage that basically the network ports (relevant for the method) of the processing computer system—in the sense described above—are initially closed and block external establishment of connections to the processing computer system, or respectively complicate manipulative access significantly. The processing computer system has permanently closed network ports for all external computer systems (except for a short period of time, in which a certain source IP address is unblocked according to the steps above), and blocks any connection establishment. Connection establishment toward the broker computer system is also blocked in this case.

Initiation of the transmission of the random port number or other information by the processing computer system for authentication of an external computer system to be unblocked can be an automated process to transmit the random port number or other information to the processing computer system (e.g. via the Unix-based command "Secure copy", scp). According to the process, the processing computer system establishes per se a connection to the broker computer system and fetches the random port number or other information. This process can be started by the processing computer system, after a predetermined data sequence was sent to the processing computer system, provided this data sequence matches a predefined sequence. The computer system sending the sequence can be the broker computer system or, alternatively, the external computer system. The IP address of the sequence sending computer system can be statically defined in the processing computer system or be dynamically taken from the source IP addresses of potential sequence-sending computer systems known to the kernel of the processing computer system.

As already mentioned above, such a method is known under the term "port-knocking". The above-mentioned steps can be performed by a so-called knock daemon, which is a program that enables port-knocking, for example. The knock daemon is informed by the kernel of the processing computer system about arriving data packets (data sequence), which were not further evaluated by the kernel, verifies the data sequence sent to the processing computer system and initiates a controlled transmission of the random port number or other information from the broker computer system to the processing computer system (e.g. by starting a script/program), provided the sent data sequence matches the predefined data sequence. Thus, the above described process enables transmitting/copying the random port number or other information from the broker computer system to the processing computer system—the process activated by the processing computer system addressing a corresponding service on the broker computer system via network—without the processing computer system having to hold available an open network port with an addressable program. Alternatively, other methods leading to a comparable result can be used.

Alternatively, or in addition to the above described port-knocking, it is also possible that the processing computer system per se polls the broker computer system at regular intervals as to whether one or multiple information to be exchanged in the sense above are available. If this is the case, a corresponding transmission of the information from the broker computer system to the processing computer system can be initiated, as described above. It is also possible that the processing computer system performs a polling once a certain time period is exceeded, for example, in which port-knocking has not been conducted on the side of the broker computer system or the external computer system. Port-knocking problems can be detected thereby, and the functionality of the computer network infrastructure is maintained.

As an alternative to the mentioned solutions (port knocking, polling), it is possible to provide a special connection network between the broker computer system and the processing computer system, with the processing computer system having at least one network port open to be addressable via this special connection network. In this case, the information to be exchanged from the broker computer system to the processing computer system can be transmitted via the connection network. Advantageously, a different protocol can be used here than is provided for a connection between the external computer system and the broker computer system. Such a change of protocol also increases security against manipulation from outside the network.

The distributed computer network comprises a computer network infrastructure including at least one broker computer system and at least one processing computer system. Furthermore, at least one external computer system is configured in the distributed computer network, which is located outside the computer network infrastructure.

The external computer system is configured to transmit an instruction packet to the broker computer system for instructing communication with the processing computer system. The broker computer system is configured to generate a random port number of a network port in an automated manner and to transmit the random port number to both the processing computer system and the external computer system.

The processing computer system comprises an access control unit configured to at least temporarily keep predetermined network ports closed such that access to the processing computer system by the external computer system via a network by these network ports is prevented, but a connection establishment between the processing computer system and the broker computer system is permitted to exchange a random port number or other information.

Furthermore, the access control unit of the processing computer system is configured to unblock a network port corresponding to the random port number for communication with the external computer system and, after establishing a connection to the selectively unblocked network port of the processing computer system, to restrict communication between the processing computer system and the external computer system to the unblocked network port of the processing computer system and a network port of the external computer system known to the processing computer system by the established connection.

Advantageously, such a distributed computer network is configured to perform a method of the above described type.

The advantages mentioned in the context of the above described method also result from a distributed computer network of this type. All advantageous measures that have been explained in the context of the above described method are applied in corresponding structural features of the distributed computer network and vice versa.

We further provide a computer program product configured to be executed on one or multiple computer systems and which, when executed, performs a method of the type described above.

Further advantageous examples are disclosed in the following description of figures.

Figure 1:
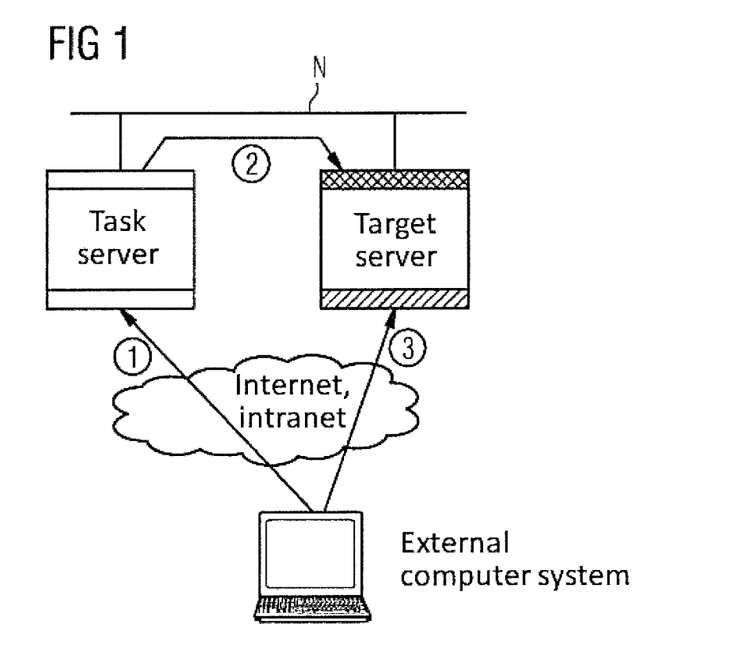
FIG. 1 is a schematic illustration of at least a part of a computer network infrastructure according to a first configuration of unblocking an external computer system.

FIG. 1 shows a schematic illustration of at least a part of a computer network infrastructure comprising a broker computer system, which is declared as a task server in FIG. 1, as well as a processing computer system, which is declared as a target server in FIG. 1. The target server may be a VPN server to selectively establish a VPN connection from an external computer system, for example. The task server and the target server can communicate with one another via a network N as well as exchange data.

In the topology shown, the task server is configured as a so-called "open" system. This means that the task server keeps at least one network port open for the purposes described in this context, with a service or an application running on the task server to enable addressability or connection establishment both from the internet or a separate intranet (indicated as a cloud in FIG. 1) and via the network N. For example, in this computer system, a network connection can be restricted via VPN ("Virtual Private Network") or SSH ("Secure Shell") or a combination of such security measures so that only predetermined, encrypted network connections with dedicated computer systems are permitted. The task server serves as a broker for communication and forwarding of data packets to the target server within the computer network infrastructure.

In contrast to the task server, the target server generally behaves as a specially secured system with closed network ports toward the network N. This is schematically illustrated by a cross-hatched input/output level at the target server toward the network N. This means that no running programs or services for addressability or connection establishment to the target server are visible or available from outside via the network N at the network ports of the target server toward the network N. Rather, non-authorized access to the target server via the network N is not possible due to the respective closed network ports of the target server. Non-authenticated connections will be suppressed, e.g. by suitable firewall rules (e.g. iptables)—either on the target server per se or on an upstream system (e.g. a router). However, it is possible that a user group can locally access the target server to perform predetermined actions locally there.

The target server comprises network ports initially closed toward the internet or external intranet as well. This is schematically shown by a hatched input/output level at the target server toward the internet or external intranet. However, to unblock an external computer system to establish a communication connection to the target server, one network port at the target server can be selectively opened toward the internet or external intranet to permit a connection from an external computer system to the target computer system. This is explained in greater detail below.

A predetermined process is configured for communication within the computer network infrastructure between the task server and the target server. Instructions can be transmitted from the target server directly to the task server via an established connection because the task server is directly addressable from the target server via network N, as described above.

In the direction toward the target server, starting from the task server or from an external computer system outside the computer network infrastructure, a port-knocking process needs to be performed first. To that end, a predetermined sequence of packet data is sent either from the task server or from the external computer system to the target server, wherein the network ports of the target server are closed and wherein the sequence addresses one or multiple network ports in a predetermined order. Subsequently, the send sequence is verified in the target server as to whether it matches a predefined sequence. If the verification was successful, a connection is established between the target server and the task server started from the target server toward the task server and a transmission of a corresponding data packet and/or an instruction about the established connection is initiated.

In particular, the target server starts a process that fetches a data packet to be transmitted (with information contained therein) from the task server. Such a process can be effected, for example, via the UNIX-based "Secure copy" (scp) command. In this way, the involved computer systems are capable of communicating with one another via network N, forwarding data packets and/or placing instructions despite closed network ports of the target computer system within the computer network infrastructure.

Hereinafter, a method of unblocking communication between the secured target server within the computer network infrastructure and an external computer system outside the computer network infrastructure is to be explained by multiple methods steps indicated in the drawing by reference numerals 1 to 3.

In a step 1, an external computer system requires communication with the target server to be unblocked via the internet and/or an intranet separated from the computer network infrastructure (network N). For example, the external computer system can be a device that connects a subsidiary (connection of corporate networks) or a client that intends to unblock an application on the target server within the computer network infrastructure. However, at this time, the target server does not have any open network ports for the external computer system and does not permit an external connection establishment.

For example, the external computer system can be located behind a NAT/PAT router (not shown) that masks a local private IP address of the external computer system with a (unambiguous) public IP address of the router. However, in this way, the external computer system is not directly addressable by the target server, because the target server does not know the exact (private) IP address of the external computer system, or respectively the external computer system is typically protected by one or multiple firewalls.

A special method has to be performed to unblock communication with the target server. To that end, an external computer system establishes a connection to the task server in step 1 via the internet/intranet (see cloud symbol in FIG. 1) and sends an instruction packet to the externally addressable task server within the computer network infrastructure via the thus established connection. An authentication of the external computer system can be required at the task server for transmission of this packet (e.g. via a VPN and/or the like).

The instruction packet contains an instruction to the broker computer system to perform corresponding processes to unblock the external computer system for communication with the target server. The instruction packet can be configured as a token sent from the external computer system to the task server. The instruction packet may also contain signed information for authentication of the external computer system at the target server. This signed information can contain, for example, signatures of the external computer system and/or a separate key computer system (not illustrated), wherein the key computer system represents a security entity that determines and signs the external computer system as a permitted computer system for access to the target server. A separate key computer system as a separated security entity provides the advantage that an authentication alone in the external computer system can not or only hardly be faked. This ensures that an external computer system intended to have the target computer at least partially unblocked for communication is actually authorized to do so.

Furthermore, the signed information in the instruction packet may also contain information about the external computer system (e.g. what service the external computer system intends to address) and/or possibly implementation parameters to perform an unblocking or a process in the target computer system to be performed after the unblocking in a predetermined manner. The instruction packet may also contain data generated from passwords (of users), e.g. hashes or signatures. A further or final authentication at the target server is optionally possible.

Furthermore, the instruction packet contains a first random number Z1 (not shown) generated by the external computer system and signed with a signature of the external computer system. Here, Z1 is encrypted in the external computer system such that the content can only be read by the target server. During or after the transmission of the instruction packet from the external computer system to the task server, a second random number Z2 (also not shown) is generated by the task server and signed with a signature of the task server. Just as well, Z2 is encrypted such that only the target server is capable of decrypting it. Z2 is transmitted from the task server to the external computer system via the established connection during or after the transmission of the instruction packet. Thus, these two random numbers Z1 and Z2 exist in each of the two computer systems after the exchange of Z1 and Z2 between the external computer system and the broker computer system.

The signatures of the random numbers Z1 and Z2 are signed with a signature in the respective other computer system (by which they were not generated) once again. This means that the signed random number Z1 is signed with a further signature of the task server in the task server and that the signed random number Z2 is signed with a further signature of the external computer system in the computer system. This provides that the order of the transfer of the random numbers (Z1 and Z2) between the external computer system and the task server can be understood for further verification in the target server.

Initiated by the instruction packet transmitted from the external computer system to the task computer system, the task server generates a random port number of a network port to be selectively unblocked in the target server for communication with the external computer system. The generated random port number is supplemented by the visible source IP address, which can be assigned to the external requesting computer system and which is, for example, the public IP address of an NAT router that sent the instruction packet to the task server. In this way, the target server knows in the subsequent method that this supplemented source IP address is to be temporarily unblocked.

The generated random port number, the visible source IP address as well as the pair of multiply signed random numbers Z1 and Z2 present in the task server are packed into a data packet for the transmission to the target server.

In a step 2, the task server sends a knock signal in the sense of a port-knocking (as described above multiple times) to the target server via the network N. A predetermined data sequence of the knocking signal is evaluated at the closed network ports of the target server via a service (e.g. a knock daemon) and compared to a predefined data sequence. If the sequences match, e.g. a script or a program is started in the target server for further processing the information present in the task server. These measures of step 2 (knocking at the target server) somehow present an initiation to the target server as to that information for further actions is available in the task server.

Subsequently, the target server causes a connection establishment via network N to the task server and starts a process of transmitting the data packet composed of the above described information from the task server to the target server via the established connection. Such a process can be effected via the UNIX based scp-command, for example. Next, the data packet is transmitted from the task server to the target server via network N of the computer network infrastructure and evaluated in the target server. Optionally, the data packet is verified regarding validity in the target server. To that end, predetermined verification steps can be performed.

In the further course of the method, the source IP address, which is known to the target server, is unblocked as the external source IP address (which can be assigned to the external requesting computer system) by the data packet (see above). To that end, the target computer system unblocks the destination network port in the direction toward the internet/external intranet, which corresponds to the generated random port number in the data packet of the task server. Other network ports of the target server remain permanently closed for the relevant IP address of the external computer system or of the NAT and do not permit any external addressability at the target server. Thus, at this stage, the target server is addressable exclusively for connection establishment originating from the source IP-address (only from this one) of an external computer system at the destination network port which is determined by the random port number generated in the task server. Furthermore, a port forwarding from the unblocked destination network port to a network port, which can be assigned to an addressable service or an addressable application in the target server, if required.

In a next step 3, which has to be effected advantageously within a fixedly predefined (short) time frame after unblocking the selective destination network port at the target server, now the external computer system, which can access the computer network infrastructure from the internet/intranet, establishes a new connection (new session with the combination "external known source IP address/selected source network port) to the opened destination network port of the target server. If, for example, no such connection establishment is effected on the side of the external computer system within a predefined time frame, the destination network port, which is selectively opened according to the method, of the target server is closed again for the relevant IP address (provided no other external computer systems having the same source IP address requesting within the same time frame) so that the target server is no longer addressable for all external computer systems having the same source IP address (initial state). Regardless thereof, external computer systems with a different IP-address cannot establish a connection to the target server during the entire course of the method.

On the other hand—if a new session is established on time—the pair of the signed random numbers Z1 and Z2, present in the external computer system, are once again transmitted via the thus established connection between the external computer system (by the known IP-address) and the target server, by the (preliminarily) opened data channel directly at the now selectively opened target server. Thus, after performing this measure, two pairs of random numbers Z1 and Z2 are present in the target server, one pair transmitted from the task server and one pair transmitted from the external computer system.

The respective random numbers Z1 and Z2 of the two pairs are verified in the target server. The verification may include a check of the signatures of the random numbers with respect to the expected systems and users and/or a verification as to whether the decrypted values of the random numbers Z1 and Z2 match. The verification is a security measure as to that the established connection has actually been established by the external computer system (and only by this system) that had previously requested to unblock the target server, and not by any other possibly manipulated computer system of an attacker having (by chance) the same source IP address. Even possible manipulation attempts at the task server can be detected by a verification of the random numbers. Due to the multi-signature of the random numbers Z1 and Z2, as described above, it can be determined at which transfer of a random number a manipulation was made or an error occurred.

In particular, the verification is a security measure against attackers, which are either located behind an NAT router having the source IP address unblocked in the target server and intend to use the unblocking for manipulative access to the target server as an attack or who have the task server under their control to interfere in the process of unblocking the target server in a manipulative manner. Due to encryption of the random numbers Z1 and Z2, the correct values to the random numbers Z1 and Z2 are not readable for other computer systems than the target server, without getting over the encryption level. As a result, attackers can hardly know the correct values of the random numbers Z1 and Z2. Even if an attacker finds out the value of random number Z1, which was generated in the external computer system, he or she still misses the correct value of the random number Z2, which was generated in the task server. On the other hand, an attacker who manipulated the task server, misses the value of the random number Z1, which was generated in the external computer system. Thus, an attacker would have to control the external computer system or even the task server (or both) and thereby get behind the encryption of the random numbers or generally control a generation of the random numbers to know the values of the random numbers Z1 and Z2 to manipulate the method.

As explained in detail above, the target server per se is secured toward an attack from the task server due to its network ports, which are permanently closed in the direction of network N. In the direction of the internet/intranet, from which an external computer system could establish a connection to the target server, access to the target server, as also described above, is restricted to the predetermined source IP address, possibly a predefined time slot, and the destination network port, which corresponds to the random port number generated in the task server. The probability of an attack is very low already due to these circumstances. By the described process of exchanging the random numbers Z1 and Z2 between the involved computer systems and due to a verification of the random numbers in the target server, a probability of a successful manipulation of the process in the computer network infrastructure for achieving an attack on the target server is further reduced.

When the verification of the pairs of random numbers Z1 and Z2 is negative, the target server assumes an error or a manipulation attempt, directly aborts per se the connection to its selectively unblocked destination network port established by the external computer system for reasons of security and closes the selectively unblocked combination of source IP/source port/destination port as well as the port forwarding existing here to the port on which the addressed service (e.g. VPN) of the target server is actually running. The target server is again in the initial state then (described state prior to the unblocking) and does not permit connection establishment for any computer system via network.

When the verification of pairs of random numbers Z1 and Z2 has been performed successfully, the established connection is restricted exclusively to the combination of the unblocked source IP address in conjunction with the source network ports, from which the direct connection to the unblocked destination network port of the target server was established by the external computer system. In this way, the target server restricts the established connection not only to the source IP address, but also to the actual source connection via the used source network port of the authorized external computer system. Further connections via the same source IP address, but via other source network ports at the target server, are suppressed thereby. In this way, potential attacking scenarios are significantly complicated or suppressed, respectively. It is to be taken into account in these measures that possibly parallelly occurring connection establishments of multiple external computer systems do not interfere with each other.

Thus, after this procedure, there is merely a selectively established connection between the source network port of the external computer system (possibly via the masked source network port of an NAT router) and a selectively unblocked destination network port at the target server. In the further course, an application-specific communication can be effected by this restricted connection between the external computer system and the target server within the computer network infrastructure.

In this way, the external computer system caused a selective unblocking of the target server for a specific communication via the described method. Nevertheless, the method is significantly more secure against external attacks when compared to conventional measures. In particular, a successful use of the security gap in the target server, e.g. by Zero-Day-Exploits, is extremely unlikely due to the random port number determined for each single unblocking, to unblock the corresponding network port in the target server. That means that individual security gaps in the described computer network infrastructure do no longer pose an attractive attacking option.

Figure 2:
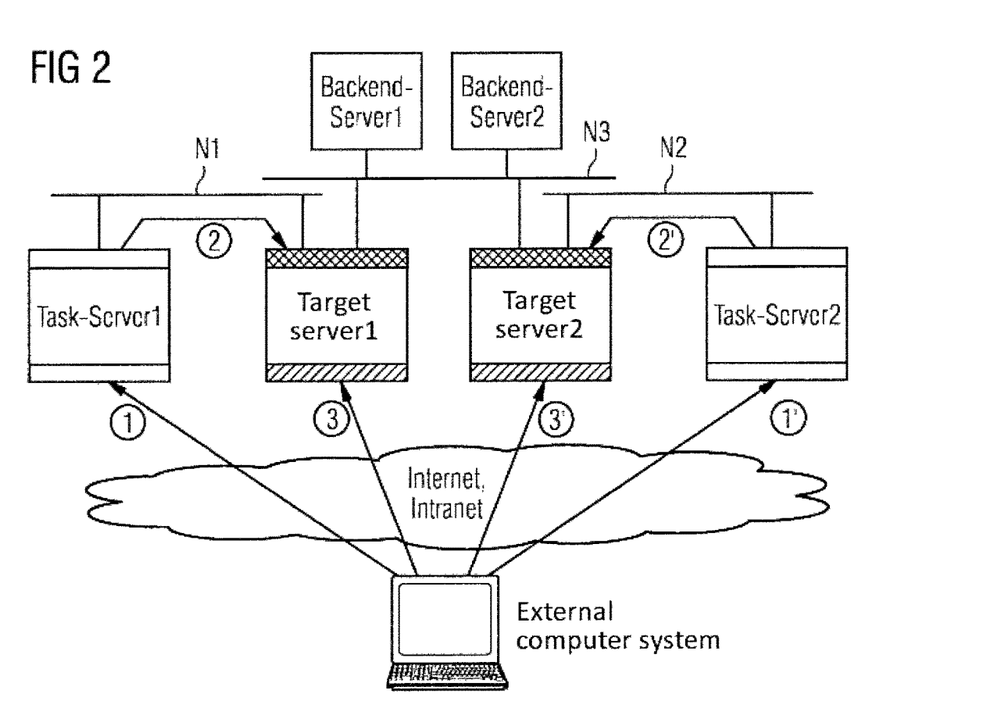
FIG. 2 is a schematic illustration of at least a part of a computer network infrastructure according to a second configuration of unblocking an external computer system.

FIG. 2 shows a schematic illustration of at least a part of a computer network infrastructure according to a second configuration. The computer network infrastructure of FIG. 2 comprises a task server 1 as well as a target server 1 connected via a network N1. Furthermore, the computer network infrastructure comprises a task server 2 as well as a target server 2 connected via a separate network N2. The target server 1 and the target server 2 in turn connect to backend servers 1 and 2 operating in the background via a third network N3. For example, target server 1 and/or target server 2 can be configured as a VPN server to respectively unblock a selective VPN connection to an external computer system. For example, application-specific services can be configured on the backend servers 1 and 2, which can be accessed by each of the target servers 1 and 2 or to which the target servers 1 and 2 can forward a connection from an external computer system so that the external computer system can use such services.

With respect to the task servers and the target servers, FIG. 2 shows a parallel and redundant structure of the corresponding elements of FIG. 1. That means that task server 1 and 2 as well as target server 1 and 2 are essentially configured to have redundant functionality. An external computer system can, as in the constellation of FIG. 1, establish a connection to the task server 1 via internet/external intranet and initiate corresponding measures according to the method described in FIG. 1 (see steps 1 to 3 described above) so that finally a connection between the external computer system and the target server 1 can be established and used. Reference is made to the descriptions in conjunction with FIG. 1 for these measures.

If communication to the task server 1 and/or to the target server 1 is disturbed or suppressed e.g. due to attacks to the computer network infrastructure, the external computer system can establish a connection to the task server 2 and initiate corresponding measures for unblocking a connection between the external computer system and the target server 2. This is effected in a process including the steps 1' to 3', which essentially correspond to steps 1 to 3 with respect to communication of the external computer system with task server 1 and target server 1 according to the above described method. Just as well, reference is made to the descriptions in conjunction with FIG. 1 in analogy (with the difference that the process is performed between the external computer system, task server 2 and target server 2). In this way, in the configuration of FIG. 2, there is a lower dependency on an attackable system (e.g. task server 1 alone). Rather, the redundant structure of the computer network infrastructure of FIG. 2 allows a flexible handling of a request of an external computer system to unblock communication with a respective target server.

In normal operation of the computer network infrastructure, it is also possible that an external computer system randomly determines one of the task servers 1 or 2, which it addresses then correspondingly via connection path 1 or 1'. Moreover, high availability and load distribution is realized in the configuration of FIG. 2 via the double or redundant structure of the task server/target server pair and the alternating addressing of the task servers 1 or 2 or subsequently the assigned target servers 1 or 2. The topology illustrated in FIG. 2 can, of course, be expanded by further task servers and/or target servers, and/or varied by changed communication relations. Optionally, it is also possible to configure a topology in which the backend servers 1 and 2 are omitted.

Figure 3:
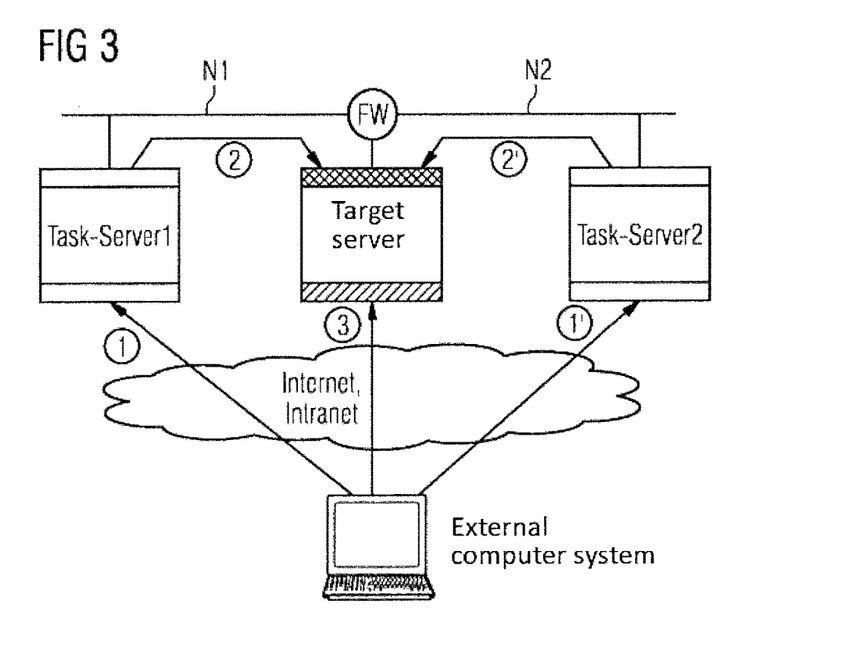
FIG. 3 is a schematic illustration of at least a part of a computer network infrastructure according to a third configuration of unblocking an external computer system.

FIG. 3 shows a schematic illustration of at least a part of a computer network infrastructure according to a third configuration. This constitutes to some extent an alternative solution from the configuration according to FIG. 1 and the configuration according to FIG. 2. The computer network infrastructure according to FIG. 3 includes a first task server 1 and a second task server 2. These two task servers can each be addressed from the internet/external intranet from an external computer system according to the above explained method. Furthermore, the computer network infrastructure includes a single target server. Just like in FIGS. 1 and 2, the target server can also be a VPN server in the topology according to FIG. 3. Task server 1 connects to the target server via a first network N1. Task server 2 also connects to the target server via a second network N2.

Similar to the topology according to FIG. 3, task servers 1 and 2 are configured redundantly. An external computer system can achieve the unblocking of the corresponding network port in the target server via the above explained measures in the steps 1 to 3 by task server 1, to establish an external connection to the target server. Alternatively, the external computer system can achieve the unblocking of the corresponding network port in the target server via the above explained measures in the steps 1', 2' and 3'by task server 2, to establish an external connection to the target server. Regarding the corresponding measures, reference is made to the above explanations in conjunction with FIGS. 1 and 2.

The computer network infrastructure of FIG. 3 additionally comprises, besides the elements mentioned, an optional packet filter FW interposed between the task servers 1 and 2 and the target server in the corresponding networks N1 and N2. The packet filter FW is configured as a security measure against attacks within the computer network infrastructure. The packet filter FW substantially prevents an attack to the target server from one or both of the task servers 1 and 2. An intruder, having obtained corresponding rights (e.g. administrator rights) in task servers 1 or 2, would have the option of an attack on the target server by a faked IP address from task server 1 or 2, to pretend to be an external client with an authorized external IP address (IP spoofing). Thus, an optional port filter on the target server (which does not permit connection establishment from other computer systems) could be avoided. In this way, an authorized access from task server 1 or 2 via a faked IP address to the target server could be pretended.

The packet filter FW, which advantageously only permits data packets of a connection already established by the target server and that uses the exact IP address of the respective task server 1 or 2 in the respective direction of communication from task server 1 or 2, respectively, to the target server, is configured as a counter measure. Other data packets are discarded at the packet filter FW in the corresponding direction of communication or ignored and not forwarded. Thus, only data packets which reliably and trustworthily originate from task server 1 or 2 reach the target server. IP spoofing is thus made extremely complicated or suppressed.

In reverse direction of communication from the target server to the task servers 1 and 2, the packet filter FW can advantageously only permit data packets which address a specific service on the task servers 1 and 2 (e.g. scp or ssh or a combination thereof).

In this way, task servers 1 and 2 are completely cut off in the direction of the target server so that no attack from the task server to the target server is successful. In the reverse direction, however, the target server can, as explained according to FIG. 1, for example, fetch a data packet containing the generated random port number and/or a source IP address of the external computer system from the corresponding task server 1 or 2 via the scp service.

The packet filter FW according to FIG. 3 can, for example, be realized as specifically secured 1:1 NAT router (IP address translation device). It is also possible to provide specific verification mechanisms in this router. In 1:1 NAT routing, IP addresses of incoming packets are statically translated into other IP addresses. For example, an incoming packet having the exemplary address 10.10.10.10 could be translated into the IP address 11.11.11.11.

The method illustrated herein comes with the advantage that unblocking of external computer systems for communication with a secured processing computer system within a computer network structure is possible in a secure way without opening the processing computer system (also) for external or internal attackers.

The method described herein can be used for both IPv4 and IPv6. Other transmission protocols can likewise be secured with this method. The installation of a corresponding computer program for performing the method on an external client (external computer system) can be implemented on a "real" client as well as on a system specifically provided to that end, which effects the corresponding unblocking. The use of a specific system has the advantage that it is limited to this functionality and can be specifically secured. This allows for increased security.

The size of an instruction packet transmitted from the external computer system to the broker computer system (task server) can advantageously be limited. This comes with the advantage that an attacker, who has overcome the general layer of encryption of an instruction packet cannot interfere the functionality of the broker computer system by a memory overflow. The same applies for other used transmission methods or communications, respectively.

In examples not shown herein, it is also possible to establish a further firewall or packet filter, respectively, (e.g. integrated in a router) in a connection path between the external computer system and a task server or a target server, respectively. This firewall or packet filter can advantageously be configured such that an address forwarding and/or port forwarding of a connection establishment from the external computer system into the computer network infrastructure to the corresponding task servers or respectively target servers is performed. This comes with the advantage that an external computer system can only use an IP address for addressability of the firewall to an unblocking according to the method of a connection to a corresponding target server without having to differentiate between one or multiple IP addresses of task servers and one or multiple IP addresses of target servers. Here, it has to be considered that source network port and source IP address of the connection establishments from the external computer system to a task server or target server, respectively, is not transcribed and present on both computer systems.

The shown examples of a computer network infrastructure are merely chosen by way of example. For example, it is possible to provide topologies of a computer network infrastructure that combine elements from the illustrated examples.

The invention claimed is:

1. A method of unblocking external computer systems for communication with secured processing computer system in a computer network infrastructure, comprising:
   transmitting an instruction packet from an external computer system, which is configured outside the computer network infrastructure, to a broker computer system within the computer network infrastructure,
   generating a random port number of a network port by the broker computer system,
   transmitting the random port number from the broker computer system to the external computer system and at least one processing computer system within the computer network infrastructure in an automated manner, wherein the processing computer system at least temporarily keeps predetermined network ports closed toward the external computer system so that access to the processing computer system by the external computer system via network by the network ports is prevented, generating and encrypting a first random number by the external computer system such that only the processing computer system can decrypt the first random number and the first random number is not read by the broker computer system, transmitting the encrypted first random number from the external computer system to the broker computer system, generating and encrypting a second random number by the broker computer system such that only the processing computer system can decrypt the second random number and the second random number is not read by the external computer system, transmitting the encrypted second random number from the broker computer system to the external computer system, transmitting the encrypted first and second random number from the broker computer system to the processing computer system, unblocking the network port corresponding to the random port number by the processing computer system for communication with the external computer system, establishing a connection to the unblocked network port of the processing computer system by the external computer system, restricting the communication between the processing computer system and the external computer system to the unblocked network port of the processing computer system and a network port of the external computer system known to the processing computer system by the established connection, transmitting the encrypted first and second random number from the external computer system directly to the processing computer system by the established connection, decrypting the encrypted first and second random number, which were transmitted to the processing computer system by the broker computer system, in the processing computer system and decrypting the encrypted first and second random number, which were transmitted directly to the processing computer system by the external computer system, in the processing computer system, and verifying a respective match between the decrypted first and second random number, which were transmitted to the processing computer system by the broker computer system, with the decrypted first and second random number, which were transmitted directly to the processing computer system by the external computer system, in the processing computer system.

2. The method according to claim 1, wherein the processing computer system at least temporarily keeps predetermined network ports closed toward the broker computer system so that access to the processing computer system by the broker computer system via network by the network ports is prevented, wherein, however, the processing computer system can access the broker computer system to retrieve the random port number and/or other information from the broker computer system.

3. The method according to claim 1, further comprising:
restricting the connection established to the selectively unblocked network port by the external computer system to an exchange of authentication information between the external computer system and the processing computer system,
verifying authentication information transmitted by the external computer system, and unblocking the connection to the selectively unblocked network port of the processing computer system established by the external computer system for extended access to the processing computer system or to further processing computer systems within the computer network infrastructure when verifying the authentication information was successful.

4. The method according to claim 1, wherein the first random number is signed with a signature of the external computer system prior to the transmission, and the second random number generated in the broker computer system is signed with a signature of the broker computer system prior to the transmission.

5. The method according to claim 4, wherein, after the transmission of the signed first random number from the external computer system to the broker computer system, the signature of the first random number is signed with a further signature of the broker computer system, and
after the transmission of the signed second random number from the broker computer system to the external computer system, the signature of the second random number is signed with a further signature of the external computer system.

6. The method according to claim 1, wherein the connection between the external computer system and the processing computer system is disestablished by the processing computer when the verification of the respective match of the first and second random numbers is negative.

7. The method according to claim 2, wherein the transmission of the random port number or other information from the broker computer system to the processing computer system comprises:
sending a predetermined data sequence from the broker computer system or from the external computer system to the processing computer system, wherein the predetermined network ports of the processing computer system are closed, and the sequence addresses one or multiple network ports of the processing computer system in a predetermined order,
verifying whether the sent data sequence matches a predetermined sequence in the processing computer system, and
causing the transmission of the random port number or other information by the processing computer system if the verification of the sent sequence is positive, wherein the processing computer system per se establishes a connection to the broker computer system and retrieves the random port number or other information from the broker computer system.

8. A distributed computer network comprising:
a computer network infrastructure including at least a broker computer system and a processing computer system, and
at least an external computer system located outside the computer network infrastructure, wherein the external computer system is configured to 1) transmit an instruction packet to the broker computer system for instructing communication with the processing computer system, 2) generate and encrypt a first random number such that only the processing computer system can decrypt the first random number and the first random number is not readable by the broker computer system, and 3) transmit the encrypted first random number to the broker computer system,
the broker computer system is configured to 1) generate a random port number of a network port in an automated manner, 2) transmit the random port number both to the processing computer system and to the external computer system, 3) generate and encrypt a second random number such that only the processing computer system can decrypt the second random number and the second random number is not readable by the external computer system, and 4) transmit the encrypted second random number to the external computer system, the processing computer system comprises an access control unit configured to keep predetermined network ports at least temporarily closed such that access to the processing computer system by the external computer system via a network by the network ports is prevented, but connection establishment between the processing computer system and the broker computer system is permitted to exchange the random port number or other information, the access control unit is further configured to unblock a network port corresponding to the random port number for communication with the external computer system and, after establishment of a connection to the selectively unblocked network port of the processing computer system, to restrict communication between the processing computer system and the external computer system to the unblocked network port of the processing computer system and a network port of the external computer system, known to the processing computer system by the established connection, the broker computer system is further configured to transmit the encrypted first and second random number to the processing computer system, the external computer system is further configured to transmit the encrypted first and second random number directly to the processing computer system by the established connection, and the processing computer system is further configured to decrypt the encrypted first and second random numbers transmitted to the processing computer system by the broker computer system and the external computer system respectively, and verify a respective match between the decrypted first and second random numbers transmitted to the processing computer system by the broker computer system and the external computer system respectively.

9. The distributed computer network according to claim 8, which is configured to perform a method comprising:

transmitting an instruction packet from an external computer system, which is configured outside the computer network infrastructure, to a broker computer system within the computer network infrastructure, generating a random port number of a network port by the broker computer system, transmitting the random port number from the broker computer system to the external computer system and at least one processing computer system within the computer network infrastructure in an automated manner, wherein the processing computer system at least temporarily keeps predetermined network ports closed toward the external computer system so that access to the processing computer system by the external computer system via network by the network ports is prevented, generating and encrypting a first random number by the external computer system such that only the processing computer system can decrypt the first random number and the first random number is not read by the broker computer system, transmitting the encrypted first random number from the external computer system to the broker computer system, generating and encrypting a second random number by the broker computer system such that only the processing computer system can decrypt the second random number and the second random number is not read by the external computer system, transmitting the encrypted second random number from the broker computer system to the external computer system, transmitting the encrypted first and second random number from the broker computer system to the processing computer system, unblocking the network port corresponding to the random port number by the processing computer system for communication with the external computer system, establishing a connection to the unblocked network port of the processing computer system by the external computer system, restricting the communication between the processing computer system and the external computer system to the unblocked network port of the processing computer system and a network port of the external computer system known to the processing computer system by the established connection, transmitting the encrypted first and second random number from the external computer system directly to the processing computer system by the established connection, decrypting the encrypted first and second random number, which were transmitted to the processing computer system by the broker computer system, in the processing computer system and decrypting the encrypted first and second random number, which were transmitted directly to the processing computer system by the external computer system, in the processing computer system, and verifying a respective match between the decrypted first and second random number, which were transmitted to the processing computer system by the broker computer system, with the decrypted first and second random number, which were transmitted directly to the processing computer system by the external computer system, in the processing computer system.

10. A computer program product configured to be executed within respective hardware processors on multiple computer systems of a distributed computer network, comprising a computer network infrastructure including at least a broker computer system and a processing computer system, and at least an external computer system located outside the computer network infrastructure, and which, when executed within the respective hardware processors, performs a method comprising:

transmitting an instruction packet from an external computer system, which is configured outside the computer network infrastructure, to a broker computer system within the computer network infrastructure, generating a random port number of a network port by the broker computer system, transmitting the random port number from the broker computer system to the external computer system and at least one processing computer system within the computer network infrastructure in an automated manner, wherein the processing computer system at least temporarily keeps predetermined network ports closed toward the external computer system so that access to the processing computer system by the external computer system via network by the network ports is prevented,     generating and encrypting a first random number by the external computer system such that only the processing computer system can decrypt the first random number and the first random number is not read by the broker computer system,     transmitting the encrypted first random number from the external computer system to the broker computer system,     generating and encrypting a second random number by the broker computer system such that only the processing computer system can decrypt the second random number and the second random number is not read by the external computer system,     transmitting the encrypted second random number from the broker computer system to the external computer system,     transmitting the encrypted first and second random number from the broker computer system to the processing computer system,     unblocking the network port corresponding to the random port number by the processing computer system for communication with the external computer system,     establishing a connection to the unblocked network port of the processing computer system by the external computer system,     restricting the communication between the processing computer system and the external computer system to the unblocked network port of the processing computer system and a network port of the external computer system known to the processing computer system by the established connection,     transmitting the encrypted first and second random number from the external computer system directly to the processing computer system by the established connection,     decrypting the encrypted first and second random number, which were transmitted to the processing computer system by the broker computer system, in the processing computer system and decrypting the encrypted first and second random number, which were transmitted directly to the processing computer system by the external computer system, in the processing computer system, and     verifying a respective match between the decrypted first and second random number, which were transmitted to the processing computer system by the broker computer system, with the decrypted first and second random number, which were transmitted directly to the processing computer system by the external computer system, in the processing computer system.

* * * * *